3,487,003
REMOVAL OF CLAY FROM THE WATER STREAMS OF THE HOT WATER PROCESS BY FLOCCULATION
Robert A. Baillie, West Chester, Pa., and Earl W. Malmberg, Wilmington, Del., assignors to Great Canadian Oil Sands Limited, Toronto, Ontario, Canada, a corporation of Canada
Filed Jan. 16, 1967, Ser. No. 609,452
Int. Cl. C02b 1/20; B01d 21/01
U.S. Cl. 208—11                         3 Claims

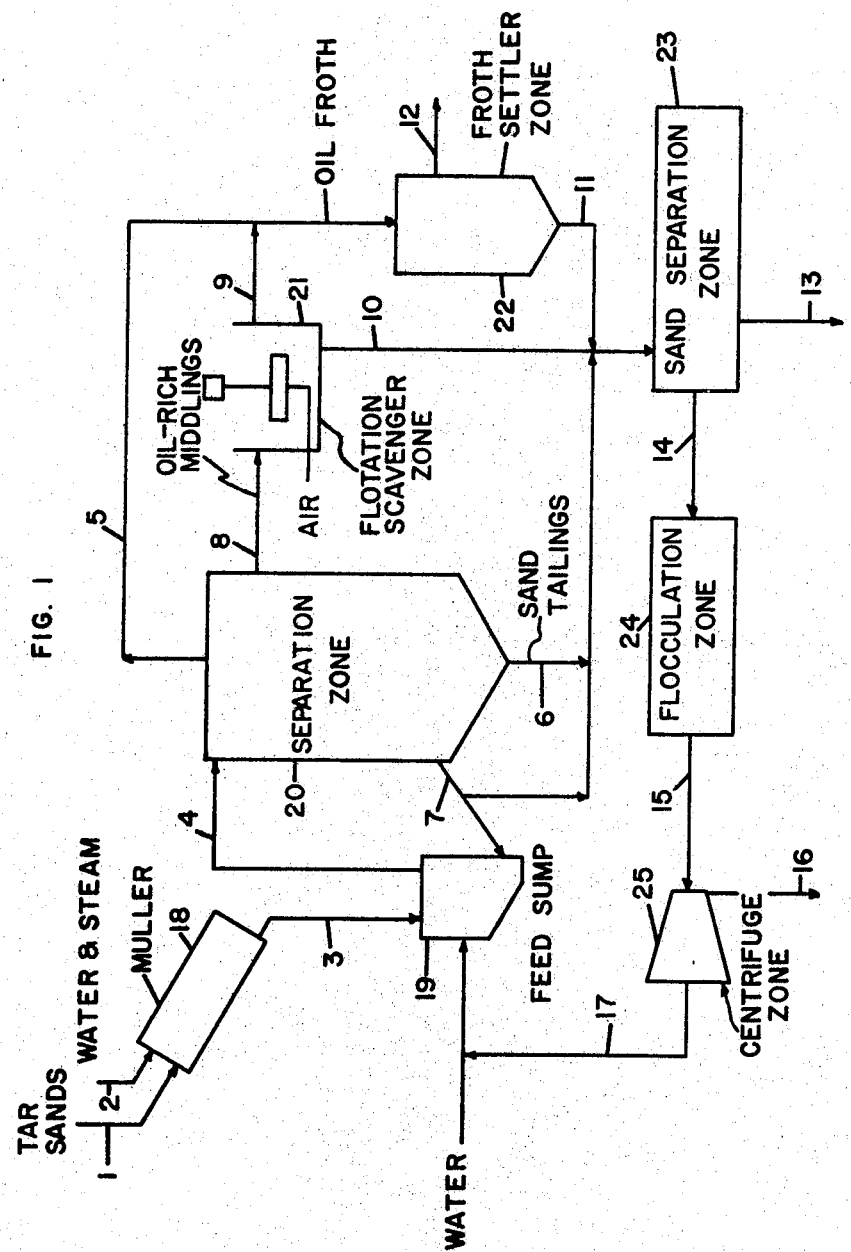

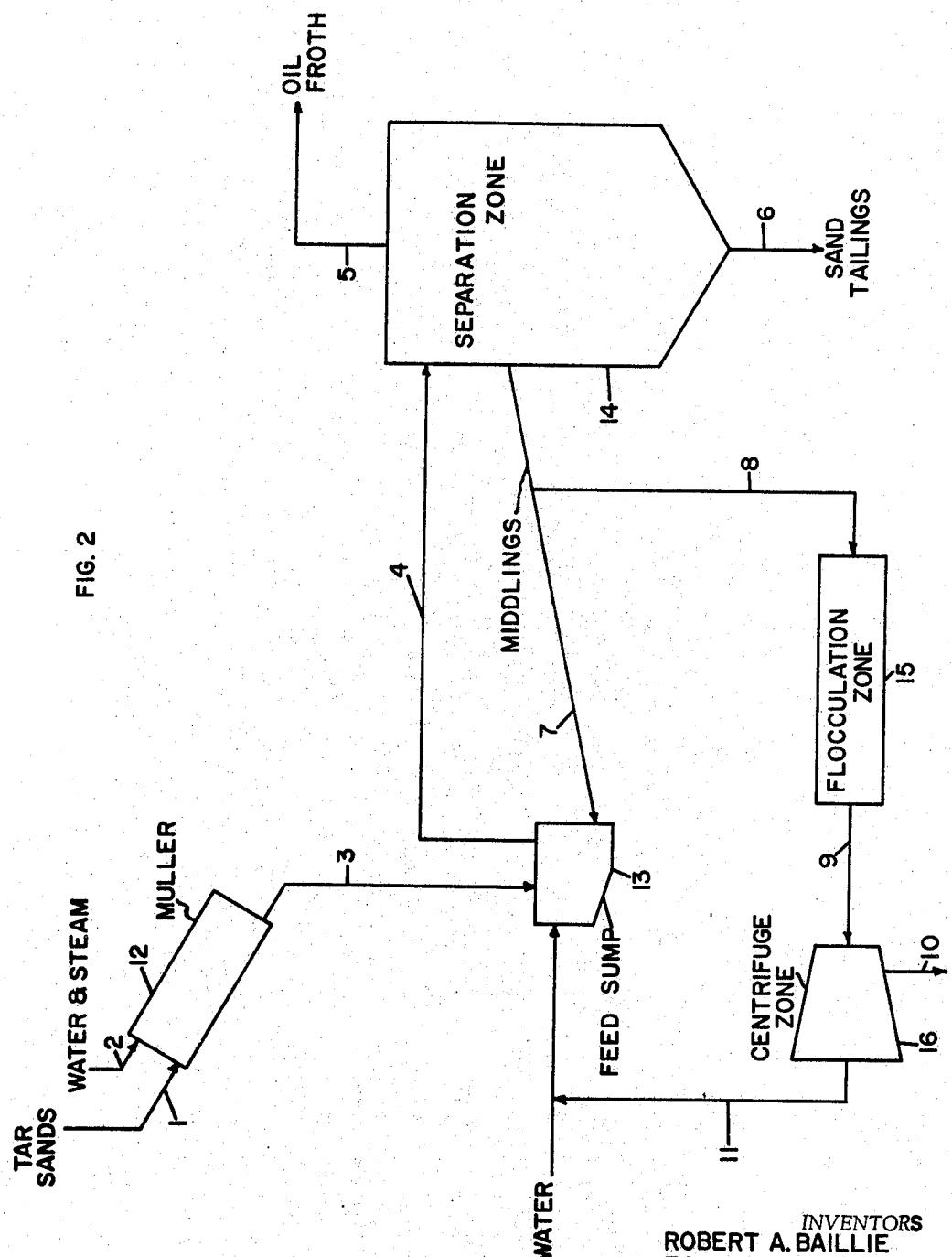

ABSTRACT OF THE DISCLOSURE

The hot water process for treating tar sands discharges several water streams. These streams contain fine clay material which make them unsuitable for recycle back into the process. By the present invention, the fine suspended clay can be removed by flocculating the clay and centrifuging the resulting floc.

Flocculation can be brought about by adjusting the pH of the water and by adding flocculating agents. In one embodiment of the invention, the water is not directly centrifuged after flocculation but is allowed to stand for a period of time.

---

This invention is concerned with an improvement in the hot water process for treating bituminous sands such as Athabasca tar sands, and the like. The invention is especially concerned with a method for the treatment of water and clay containing effluents discharged from the process.

Tar sands which are also known as oil sands and bituminous sands are siliceous materials which are impregnated with a heavy petroleum. The largest and most important deposit of the sands are the Athabasca sands found in northern Alberta, Canada. These sands underlay more than 13,000 square miles at depths of 0 to 2000 feet. Total recoverable reserves after extraction and processing are estimated at more than 300 billion barrels—just about equal to the world-wide reserves of conventional oil, sixty percent of which is in the Middle East. By way of comparison, the American Petroleum Institute estimated total United States oil reserves at the end of 1965 at 39.4 billion barrels.

The tar sands are primarily silica, having closely associated therewith an oil film which varies from about 5 percent to 21 percent by weight, with a typical content of 13 weight percent, of the sand. The oil is quite viscous—6° to 8° API gravity—and contains typically 4.5 percent sulfur and 38 percent aromatics.

In addition to oil and sand, the composition of the sands includes clay and silt in quantities of from 1 to 50 weight percent, more usually 10 to 30 percent, and a small amount of water in quantities of 1 to 10 percent by weight.

Several basic extraction methods have been known for many years for the separation of oil from the sands. In the so called "cold water" method, the separation is accomplished by mixing the sands with a solvent capable of dissolving the bitumen constituent. The mixture is then introduced into a large volume of water, water with a surface agent added, or a solution of a neutral salt in water. The combined mass is then subjected to a pressure or gravity separation.

In the hot water method, the bituminous sands are jetted with steam and mulled with a minor amount of hot water at temperatures in the range of 170 to 190° F. The resulting pulp is dropped into a turbulent stream of circulating hot water and carried to a separation cell maintained at a temperature of about 185° F. In the separation cell, sand settles to the bottom as tailings and oil rises to the top in the form of a froth. An aqueous middlings layer containing some clay, silt and oil is formed between these layers. This basic process may be combined with a scavenger step for further treatment of the middlings layer obtained from the primary separation step to recover additional amount of oil therefrom.

The froths from the primary extraction and the scavenger step are combined, chemically treated and settled in a froth settler. This settling allows mineral and water to drop from the bitumen-rich product to form a dragstream. The product is withdrawn, diluted with naphtha and centrifuged to remove more water and residual sand. The naphtha is then distilled off and the bitumen is coked to a high quality crude suitable for further processing.

Although both the cold water process and the hot water process have been known for a number of years to be useful for the separation of the oil from the sands, no process has yet been used for the separation on a commercial scale because of the tremendous technological and economic problems encountered in scaling up the process from a laboratory or pilot plant operation to a full scale commercial production. However, the Great Canadian Oil Sands, Ltd. Company is currently building a plant which they expect to be on stream by the end of September 1967 and which, using basically the hot water process described above, will produce an expected 45,000 barrels per day of upgraded synthetic crude oil.

The present invention is directed to an improvement in the hot water process and specifically relates to a process for treating the middlings or effluent discharge from the hot water process. In this specification, the term, "effluent discharge," will be used to include the following: (1) middlings material of depleted oil content which has undergone final treatment in the hot water process, and which comprises clay, silt, sand and some oil dispersed in water; (2) sand tailings; (3) other discharged water containing fractions which are not the primary products of the hot water process; and (4) combinations of the foregoing. The effluent discharge is removed from the process plant usually as a slurry of about 35 to 55, typically 45 percent solids by weight. Included in the slurry is sand, clay, and small quantities of bitumen ranging from about 0.5 to 2.0 weight percent of the total discharge.

In this specification sand is siliceous material which will not pass a 325 mesh screen. Silt will pass 325 mesh but is larger than 2 microns. Clay is material smaller than 2 microns including some siliceous material of that size.

It is highly desirable for a number of reasons to recycle the water from the effluent discharge back into the hot water process. Firstly, because the effluent contains oil emulsions, finely divided clay with poor settling characteristics and other contaminants, the discharge of the effluent into rivers, lakes, or other natural bodies of water might cause water polution. Recycle would eliminate this problem, Secondly, storage in evaporation ponds is expensive because of large space requirements and requisite construction of dikes. If the water from the effluent could be recycled back into the process and reused, this problem would also be avoided.

The term "process water" hereinafter will refer to effluent discharge substantially reduced in sand content as, for example, water separated from sand in the effluent by settling, filtering, percolation, etc. This process water may be added to fresh water in a desired amount and recycled back into the hot water process. Prior to the present invention, after a certain amount of process water or middlings had been recycled, and added to fresh water, the middlings in the separator would become loaded with mineral fines, primarily clay, to the point where the oil flotation step in the process became inoperative.

It might seem that the solution to this problem would simply be to remove the mineral fines from the middlings or process water prior to recycle. However, the fines suspended in the water discharged from the hot water process are unique in nature both because of the manner in which the emulsions or suspensions are formed and also because of the influence of other materials, particularly oil alone or associated with mineral. This oil is dissolved, suspended or otherwise held in the process water. It exerts an effect upon the suspensions of silt and clay so that conventional methods of separating solids from liquids may not necessarily be used to treat the effluent discharges.

The most difficult problem in separating clay from the waters is caused by the presence of this oil. It is thought that the oil is somehow tied up on the surface of the clay making conventional flocculation difficult and making flocculation combined with filtration and settling and other conventional separation techniques inoperable for separating the slit and clay from the water.

When the clay suspensions in the process water are treated by flocculation alone, large volumes of precipitate are formed from which only a small portion of water can be recovered. Also flocculation does not increase to any appreciable degree the filterability or settling of the slit and clay.

A method of treatment has been devised which allows for excellent recovery of water suitable for recycle back into the hot water process. This method is a combined flocculating centrifuging treatment and involves the steps of collecting an effluent discharge from the hot water process; flocculating the clay component of at least a portion of the discharge and subjecting the water containing the flocculated clay to a centrifuging operation whereby the water is separated from the flocculated clay component. The resulting treated water is suitable as feed water to the hot water process as described above. The water works well in the process and does not cause any of the difficulties, described above, encountered with recycle middlings or process waters which have not been subjected to the flocculating centrifuging process of this invention.

One embodiment of the present invention comprises flocculating the clay component of at least a portion of the middlings layer, centrifuging the portion to remove the flocculated clay, recovering the portion substantially reduced in clay content and utilizing it as a recycle stream to be mixed with fresh oil sands to form a pulp as in the first step of the hot water process.

FIGURE 1 of the drawings shows a schematic flow diagram of the present invention as applied to at least a portion of the effluent discharge.

FIGURE 2 of the drawings shows a schematic flow diagram of the present invention as applied to at least a portion of the middlings.

Centrifuging of water from the hot water process to remove fines has been shown by Coulson, United States Patent 2,968,603. But this patent does not contemplate the combination of flocculating-centrifuging. It has surprisingly been found that this combined flocculating-centrifuging works well on the process water from the effluent discharge or middlings to free water from suspended clay although the same degree of centrifuging without flocculation allows very little water to be recovered for recycle.

The effluent from the hot water process contains between about 35 to about 55 weight percent solids. Much of the heavier and coarser solids may be removed by any of the methods well known in the art such as settling, filtering, etc., or the percolation process disclosed in the Baillie application, Ser. No. 567,232, now Patent No. 3,398,833 issued July 16, 1968.

Process water containing between 2 and about 15 weight percent solids, most likely about 6 to 12 percent, is recovered from the settling step. These solids consist mainly of finely divided clay in suspension which will not settle with standing. Furthermore, the clay may not be separated from the water by conventional means used in the art such as centrifuging alone, flocculation and filtering, clarifying, etc. It is necessary, rather to apply the combined flocculating-centrifuging technique of this invention.

In flocculation, individual particles, in this case clay particles, are united into rather loosely bound agglomerates or flocs. The degree of flocculation is controlled by the probability of collision between the clay particles and their tendency toward adhesion after collision. Agitation increases the probability of collision and adhesion tendency is increased by the addition of flocculants.

Reagents act as flocculants through one or a combination of three general mechanisms: (1) Neutralization of the electrical repulsive forces surrounding the small particles which enables the Vander Waals cohesive force to hold the particles together once they have collided; (2) Precipitation of voluminous flocs, such as metal hydroxides, that entrap fine particles; and (3) Bridging of particles by natural or synthetic, long-chain, high-molecular-weight polymers. These polyelectrolytes are believed to act by adsorption (by ester formation or hydrogen bonding) of hydroxyl or amide groups on solid surfaces, each polymer chain bridging between more than one solid particle in the suspension.

The particular flocculation step used in this invention is not important. The step may or may not require equipment beyond a reagent feeder. Merely adding the reagent to a pipeline leading to the centrifuge is adequate, but it is preferred to add the flocculant directly to the bowl of the centrifuge since this improves separation efficiency by a factor or two or three probably because it reduces shearing of the forming flocs.

Both the rate of flocculation and quality of floc formed can be improved by gentle agitation which increases the rate at which the clay particles collide. Care should be used to avoid local shear rates which tend to disintegrate existing flocs. Conventional flocculating devices usable employ slow-moving paddles whose low-shear, rolling action will not shear the flocs already formed, but will ensure optimum opportunity for particle collision and adhesion.

The amount of flocculating aid employed may be varied over a considerable range and is dependent upon the particular agent used. For example, if a calcium compound is used as the flocculating reagent, it may be employed in an amount sufficient to provide between about 10 and about 40 pounds of calcium ion per ton of clay in the system. It may be introduced into the system in solid form, but it is usually more convenient to handle as an aqueous solution of about 5 to 30 weight percent concentrations. The desired amount of flocculant may be metered through pumps or otherwise added to the feed line to the centrifuge or to storage or settling areas where the process water is contained.

Among the various reagents useful for flocculating clay are aluminum chloride, polyalkylene oxides such as polyethylene oxide, compounds of calcium such as calcium hydroxide, calcium oxide, calcium chloride, calcium nitrate, calcium acid phosphate, calcium sulfate, calcium tartrate, calcium citrate, calcium sulfonate, calcium lactate, the calcium salt of ethylene diamine titraacetate and similar organic sequestering agents. Also suitable are quar flour or a high molecular weight acrylamide polymer such as polyacrylamide or a copolymer of acrylamide and a copolymerizable carboxylic acid such as acrylic acid. Additional flocculants include the polymers of acrylic or methacrylic acid derivatives, for example, acrylic acid, methacrylic acid, the alkali metal and ammonium salts of acrylic acid or methacrylic acid, acrylamide, methacrylamide, the aminoalkyl acrylates, the aminoalkyl acrylamides, the aminoalkyl methacrylamides and the N-alkyl substituted aminoalkyl esters of either acrylic or methacrylic acids.

In an embodiment of the present invention, flocculation is accomplished by changing the pH of the process water or middlings. Classically clay is flocculated by cations such as iron and aluminum by the mechanism of compression of the double layer charge on the suspended particles. Variation of pH causes a change in the charge on the edges of the clay particles thus allowing flocculation. The effluent discharge from the hot water process has a pH ranging from about 7.5 to 9.0 typically about 8.3. In this range, the contained mineral material does not flocculate, however raising the pH above about 9.0 or lowering it below about 7.5 does cause flocculation.

With one embodiment of the present invention, flocculation is brought about by lowering the pH of at least a portion of the process water or middlings to below about 7.5 preferably in the range of 7.0 to 7.5. In another embodiment flocculation is brought about by raising the pH to above about 9.5. Flocculation aids may be used with either method but good results are achieved without such aids.

Generally it is necessary to add alkali metal-containing alkaline reagents to the hot water process to bring the pH of the middlings layer in the separator within the range of 7.5 to 9.0. The embodiment of this invention relating to flocculation at high pH eliminates the necessity of adding such reagents since recycle water which has been treated at high pH may be mixed with fresh water in such proportions so as to maintain the middlings pH in the desired range.

The type of centrifuges used to concentrate the clay floc may vary widely depending upon the degree of separation desired, the initial concentration of solids in the feed, the size of the clay particles, etc. For example, automatic and continuous basket centrifuges, conveyor-discharge centrifuges, tubular or disk-type centrifuges, continuous or automatic slurry discharge centrifuges, tubular or disk-type centrifuges, involving a screen or filter, etc., may be employed. Broadly speaking, the centrifuge may be one adapted to a continuous process or a batch technique.

Excellent success may be had in the employment of a continuous centrifugal filter known as a Bird Centrifuge Filter. Broadly speaking, this will-known centrifuge consists of two concentric drums mounted for rotation around a single horizontally disposed axis, and associated with means for rotating both drums in the same direction. The outer drum is known as the filter drums and the inner drum the conveying member. The slurry, flocculated clay in process water, is generally introduced between the two drums and whirled against the inner wall of the outer drum which consists of a slotted plate. The cake of concentrated floc which results is retained on the inner wall and the filtrate passes through. The inner or conveying drum carries a series of discharge plows facing the outer drum, and rotates slightly slower than the outer filter drum. In this way, the plows, which are helically disposed to act as a screw conveyor, scrape the deposited floc cake along the filtering surface toward the discharge. The filtrate is collected separately. The floc cake by virtue of the centrifugal force and the discharge plows, reaches an annular discharge channel opening along a sector of the centrifuge drum casing and is thrown out into a chamber also provided in the casing. The slots in the plate forming the outer drum are cut to dimensions appropriate to the range in size of the clay flocs to be treated, and likewise, the diameter of the filter drum as well as its lengths and rotational speed may be varied considerably. The speed of the conveyor drum is dependent generally upon the gear ratio in the gear train assembly which is used to drive the drums. In some cases the capacity for larger machines of this type may be as much as 12 tons per hour.

Factors such as the centrifuge equipment employed, the degree of separation desired, concentration and type of clay floc, whether or not the centrifuging process is a continuous or batch method, etc., determine the residence time of the floc being concentrated in the centrifuge. Such time may vary over a wide range from as little as one second to as long as many hours or even longer with batch processes. With a continuous centrifuge process, residence time generally varies from about one second to five minutes. With the higher speed equipment, such time may be cut down to between one to sixty seconds.

Generally the process of this invention relates to flocculating the clay in at least a portion of the process water or middlings from the hot water process and subsequent centrifuging of the suspended floc. Several variations can be made to this general process to give equivalent results and sometimes surprisingly improved results. For example, in one method of treatment, after flocculating the clay, the flocculated mixture is allowed to stand for a period before centrifugation. Surprisingly, with standing, the mineral content of the recovered water after centrifuging is reduced one-half to one-third the centrifuged value obtained when the clay is flocced and immediately centrifuged. Better results are achieved with a settling period of any length over immediate centrifuging and periods of up to about 30 hours give best results. Periods greater than this give good results but are economically less desirable than the shorter times. This embodiment may be used in a process involving either batch or continuous centrifuging. With the latter, feed streams may be fed to the centrifuge from alternative settling tanks.

The drawings further illustrate the invention:

In the first figure bituminous tar sands are fed into the system through line 1 where they first pass to a conditioning drum or muller 18. Water and steam are introduced to the muller through line 2. The total water so introduced in liquid and vapor form is a minor amount based on the weight of the tar sands processed. The tar sands conditioned with water pass via line 3 to the feed sump 19 which serves as a zone for diluting the pulp with additional water before passage to the separation zone 20.

The pulped tar sands are continuously flushed from feed sump 19 through line 4 into the separator 20. The settling zone in separator 20 is relatively quiescent so that oil froth rises to the top and is withdrawn via line 5 while the sand settles to the bottom as a tailings layer which is withdrawn through line 6.

A middlings stream is withdrawn through line 7 to be processed as described infra. Another middlings stream, which is relatively oil-rich compared to the stream withdrawn through line 7, is withdrawn from the cell via line 8 to a flotation scavenger zone 21. In this zone an air flotation operation is conducted to cause the formation of additional oil froth which passes from the scavenger zone through line 9 in mixture with the primary froth from the separator 20 to a froth settler 22. An oil-lean water stream is removed from the bottom of the scavenger zone 21 through line 10 to be further processed as described infra. In the settler zone 22, some further oil-lean water is removed from the froth and removed through line 11 to be mixed with the oil-lean water stream from the flotation scavenger zone, the sand tailings stream from the separation zone and a portion of the lower middlings withdrawn from the separation zones. The bitumen from the settler is removed through line 12 for further treatment.

The oil-lean water from the froth settler, the scavenger zone and the separator and the tailings from the settler, all of which make up an effluent discharge stream, are treated in the sand separation zone 23 from which sand is withdrawn via line 13 and discarded and a process water stream is withdrawn via line 14 to the flocculation zone 24. In the flocculation zone, a substantial amount of clay suspended in the process water is coagulated and a slurry of coagulated clay in process water is withdrawn in line 15 to the centrifuge zone 25. In the centrifuge zone, coagulated clay is separated from the process water and discarded via line 16. Water substantially reduced in clay and sand content compared to the effluent discharge is recovered from the centrifuge zone and is recycled via line 17 to be mixed with fresh water and charged into the hot water process.

The second figure shows an embodiment of the invention wherein a portion of the middlings is treated. Tar sands are fed through line 1 to the muller 12 where they are mixed with water and steam introduced through line 2. The sands are conditioned in the muller to a pulp and are withdrawn through 3 to feed sump 13 where the pulp is diluted with additional water.

The flooded sands are then flushed from the sump through line 4 into the separator 14 where a quiescent settling takes place to form an oil froth which is withdrawn via line 5 while sand settles to the bottom as a tailings layer which is withdrawn through line 6.

A middlings layer is withdrawn through line 7 and is divided into two portions. A first portion continues through line 7 and is recycled back through the feed sump 13 where it is utilized for flooding the pulp. The amount of recycled, clay containing middlings is controlled to regulate the viscosity of the separation zone to optimize oil froth recovery. The control of recycle to control separation zone viscosity is taught and claimed in United States patent application Ser. No. 509,589, now U.S. Patent No. 3,401,110, issued Sept. 10, 1968.

The second middlings portion is sent via line 8 to the flocculation zone 15. In this zone a substantial amount of clay suspended in the portion is coagulated and a slurry of coagulated clay in water is withdrawn in line 9 to the centrifuge zone 16. In this zone, coagulated clay is separated from the water and discarded through line 10. The water recovered from the centrifuge zone is recycled via line 11 back to the feed sump 13.

The above examples illustrate the invention. In each run AP–30 was added in the specified amount to tailings pond water heated to about 90° F. The tailings pond water was a clay suspension which had been discharged as tailings and middlings from a hot water process and allowed to settle in an enclosed pond. The water contained 7.1 weight percent mineral based on total weight. AP–30 is a synthetic high-molecular weight anionic polymer. After addition of the flocculant, the pH of the suspension was adjusted by the addition of sulfuric acid. In runs 1 through 10 the samples were centrifuged directly after addition of flocculant and acid. In runs 11 through 14 the samples were allowed to stand at 80° C. for 24 hours. Results of the runs are tabulated in the above table.

The $Q/\Sigma$ values given in the table are a measure of the relative severity of the centrifuging applied. Q represents the equivalent rate of flow of liquid phase through the centrifuge. $\Sigma$ is a factor relating the physical dimensions of the centrifuge-velocity and radium of rotation—to theoretical capability. The $Q/\Sigma$ concept is discussed in detail in Weissberger, Technique of Organic Chemistry, volume III, part I, second edition.

Runs 1 through 14 show that the mineral content of a clay suspension can be reduced by the flocculating-centrifuging process of the present invention. Runs 11 through 14 show the improved results obtained by allowing the treated suspension to stand before centrifuging.

The process of the present invention was also run using a continuous process of centrifuging. In each of these runs flocculating aid and/or sulfuric acid was added and the sample continuously charged into a bench scale tubular centrifuge. Typically this process reduced the mineral content from 7.1 weight percent to from 4.2 to 5.6 weight percent.

What is claimed is:

1. In a hot water process for separating oil from bituminous sands comprising the steps
   (a) forming a mixture of bituminous sand and water;
   (b) passing said mixture into a separation zone;
   (c) settling said mixture in the separation zone at a temperature in the range of 130 to 210° F. to form an upper oil froth layer, a middlings layer comprising water, clay and oil and a sand tailings layer;
   (d) separately removing the oil froth layer, the sand tailings layer and a middlings layer and
   (e) collecting an effluent discharge from said process comprised of the effluent from the sand tailings layer and the middlings layer, said effluent discharge having a pH in the range of 7.5 to 9.0 and a solids content in the range of 35 to 55 weight percent, a method of substantially reducing the solids content of said effluent discharge which comprises
   (i) adding a flocculating reagent to said effluent discharge,
   (ii) adjusting the pH of said effluent discharge to a pH less than 7.5 or more than 9.0 to effect floccula-

TABLE I

| | Reagent, p.p.m. | | pH | Method | $Q/\Sigma$ | Percent mineral content | | Density filtrate | Weight percent unremoved mineral |
|---|---|---|---|---|---|---|---|---|---|
| | AP–30 | Sulfuric acid | | | | Feed | Filtrate | | |
| 1 | 15 | 200 | 7.00 | Lab bottle centrifuge | 1.37 | 7.1 | 4.5 | 1.018 | 63 |
| 2 | 15 | 200 | 7.00 | do | 0.63 | 7.1 | 3.8 | 1.014 | 54 |
| 3 | 15 | 200 | 7.00 | do | 0.40 | 7.1 | 3.2 | 1.011 | 45 |
| 4 | 30 | 200 | 7.00 | do | 1.37 | 7.1 | 3.3 | 1.010 | 46 |
| 5 | 30 | 200 | 7.00 | do | 0.63 | 7.1 | 2.8 | 1.008 | 39 |
| 6 | 30 | 200 | 7.00 | do | 0.40 | 7.1 | 2.6 | 1.007 | 37 |
| 7 | 7.5 | 150 | 7.31 | do | 1.57 | 7.1 | 5.0 | 1.021 | 70 |
| 8 | 7.5 | 150 | 7.31 | do | 0.63 | 7.1 | 4.4 | 1.017 | 62 |
| 9 | 15 | 150 | 7.31 | do | 1.57 | 7.1 | 4.4 | 1.017 | 62 |
| 10 | 15 | 150 | 7.31 | do | 0.63 | 7.1 | 3.4 | 1.012 | 48 |
| 11 | 15 | 200 | 7.00 | do | 1.79 | 7.1 | 3.4 | 1.012 | 48 |
| 12 | 15 | 200 | 7.00 | do | 0.72 | 7.1 | 1.8 | 1.005 | 25 |
| 13 | 30 | 200 | 7.00 | do | 1.79 | 7.1 | 2.7 | 1.008 | 38 |
| 14 | 30 | 200 | 7.00 | do | 0.72 | 7.1 | 0.9 | 1.002 | 13 | tion of at least a portion of the solids of said effluent discharge,
   (iii) centrifuging said effluent discharge containing flocculated solids and
   (iv) recovering an effluent discharge substantially reduced in solids content.

2. A process according to claim 1 in which flocculating Step (ii) comprises adjusting the pH of said portion to below about 7.5.

3. A process according to claim 1 in which the flocculating Step (ii) comprises adjusting the pH of the portion to above about 9.5.

References Cited

UNITED STATES PATENTS 2,957,818  10/1960  Fischer _____ 208—11
3,075,913  1/1963   Scheffel et al. _____ 208—11
3,401,110  9/1968   Floyd et al.

OTHER REFERENCES

Iler, Ralph K., The Colloid Chemistry of Silica and Silicates, Cornell Univ. Press, Ithaca, N.Y., 1955, pp. 223–228, 259–261.

DELBERT E. GANTZ, Primary Examiner

T. H. YOUNG, Assistant Examiner

U.S. Cl. X.R.

210—42